US009729780B2

(12) United States Patent
Jorgensen et al.

(10) Patent No.: US 9,729,780 B2
(45) Date of Patent: Aug. 8, 2017

(54) IMAGING APPARATUS AND CONTROLLER FOR PHOTOGRAPHING PRODUCTS

(75) Inventors: Anders Patrick Jorgensen, Haarlem (NL); Jorik Blaas, Utrecht (NL); Mathias Funk, Eindhoven (NL)

(73) Assignee: VISUAL RETAILING HOLDING B.V., Haarlem (NL)

( * ) Notice: Subject to any disclaimer, the term of this patent is extended or adjusted under 35 U.S.C. 154(b) by 534 days.

(21) Appl. No.: 14/130,971

(22) PCT Filed: Jul. 8, 2011

(86) PCT No.: PCT/EP2011/061652
§ 371 (c)(1),
(2), (4) Date: Apr. 24, 2014

(87) PCT Pub. No.: WO2012/149983
PCT Pub. Date: Nov. 8, 2012

(65) Prior Publication Data
US 2014/0232838 A1  Aug. 21, 2014

(51) Int. Cl.
*H04N 5/232* (2006.01)
*G03B 15/03* (2006.01)
(Continued)

(52) U.S. Cl.
CPC ......... *H04N 5/23216* (2013.01); *G03B 15/03* (2013.01); *G03B 15/07* (2013.01);
(Continued)

(58) Field of Classification Search
CPC .. H04N 5/23216; H04N 5/262; H04N 5/2256; H04N 5/23293; H04N 5/23203;
(Continued)

(56) References Cited

U.S. PATENT DOCUMENTS 5,315,666 A * 5/1994 Norton-Wayne .... G01B 11/024
                                                                382/111
6,396,949 B1   5/2002 Nichani
(Continued)

FOREIGN PATENT DOCUMENTS

| FR | 2875614 | 3/2006 |
| GB | WO9426057 | * 11/1994 ............... H04N 1/00 |
| GB | 2464742 | 4/2010 |

OTHER PUBLICATIONS

Communication from corresponding foreign application 11 730 029.3-1905 dated Feb. 25, 2014 "and third party observation pertaining to reference DT cited in Office Action".
(Continued)

*Primary Examiner* — Dramos I Kalapodas
(74) *Attorney, Agent, or Firm* — Steven M. Koehler; Westman, Champlin & Koehler, P.A.

(57) ABSTRACT

The invention provides an all-in-one imaging apparatus for photographing products, particularly suitable for photographing fashion related products such as apparel products, fashion accessories or other life style products. The imaging apparatus comprising a table part, a portable controller for user interaction with the table part, and a storage for storing images. The table part comprises a substantially horizontal table surface for supporting the product, lights, a fixture for fixing a camera, a backlighting system below the table surface, and an embedded system comprising an embedded computer and a wireless communication controller. The embedded computer controls the camera, switches the backlighting system, wirelessly transmits a live stream from the camera to the portable controller, and wirelessly receives instructions from the portable controller.

19 Claims, 6 Drawing Sheets

(51) Int. Cl.
*G03B 15/07* (2006.01)
*H04N 5/225* (2006.01)
*H04N 5/262* (2006.01)

(52) U.S. Cl.
CPC ....... *H04N 5/2256* (2013.01); *H04N 5/23203* (2013.01); *H04N 5/23293* (2013.01); *H04N 5/262* (2013.01)

(58) Field of Classification Search
CPC .. H04N 1/00204; H04N 1/00413; H04N 7/15; H04N 21/4788; H04N 21/25808; H04N 21/4223; H04N 21/4143; H04N 7/141; H04N 7/18; H04N 5/23206; G03B 15/03; G03B 15/07; G03B 15/00; G03B 15/02; G03B 21/62; G02B 6/0001; G02B 6/0051; G02B 6/0055; G02B 6/0021; G01B 11/024; G01B 11/03; G01B 11/24; G01B 11/02; G06T 1/00; G06F 3/0484; G06F 3/0416
See application file for complete search history.

(56) References Cited

U.S. PATENT DOCUMENTS

| | | | | |
|---|---|---|---|---|
| 7,931,380 B2* | 4/2011 | Williams | | G03B 15/02 |
| | | | | 362/11 |
| 8,134,475 B2* | 3/2012 | Reams | | H04N 5/4403 |
| | | | | 340/12.22 |
| 8,326,136 B1* | 12/2012 | Clark | | G03B 15/02 |
| | | | | 396/164 |
| 8,538,250 B2* | 9/2013 | Clark | | G03B 15/02 |
| | | | | 362/233 |
| 8,614,766 B1* | 12/2013 | Clark | | H04N 5/2256 |
| | | | | 348/370 |
| 9,085,190 B2* | 7/2015 | Andres | | G07D 7/122 |
| 2004/0052076 A1* | 3/2004 | Mueller | | F21V 23/0442 |
| | | | | 362/293 |
| 2004/0171923 A1* | 9/2004 | Kalafut | | A61B 5/0059 |
| | | | | 600/407 |
| 2005/0047134 A1* | 3/2005 | Mueller | | F21V 23/0442 |
| | | | | 362/231 |
| 2005/0073575 A1* | 4/2005 | Thacher | | H04N 7/141 |
| | | | | 348/14.13 |
| 2006/0061665 A1 | 3/2006 | Lai | | |
| 2008/0122805 A1* | 5/2008 | Smith | | A63F 13/06 |
| | | | | 345/175 |
| 2009/0059378 A1* | 3/2009 | Thompson | | G02B 6/0051 |
| | | | | 359/599 |
| 2010/0214398 A1* | 8/2010 | Goulart | | H04N 21/2387 |
| | | | | 348/61 |
| 2010/0277673 A1* | 11/2010 | Hoelen | | C04B 35/44 |
| | | | | 349/68 |
| 2011/0058052 A1 | 3/2011 | Bolton | | |
| 2011/0085016 A1 | 4/2011 | Kristiansen | | |
| 2011/0141031 A1* | 6/2011 | McCullough | | G06F 3/0481 |
| | | | | 345/173 |
| 2011/0285863 A1* | 11/2011 | Burke | | H04N 5/23206 |
| | | | | 348/207.1 |
| 2012/0056971 A1* | 3/2012 | Kumar | | H04M 3/567 |
| | | | | 348/14.02 |
| 2015/0015599 A1* | 1/2015 | Yaras | | G09G 3/2037 |
| | | | | 345/600 |

OTHER PUBLICATIONS

International Search Report and Written Opinion for corresponding PCT/EP2011/061652, filed Jul. 8, 2011.

* cited by examiner

IMAGING APPARATUS AND CONTROLLER FOR PHOTOGRAPHING PRODUCTS

CROSS-REFERENCE TO RELATED APPLICATION

The present application is a national stage filing of International patent application Serial No. PCT/EP2011/061652, filed Jul. 8, 2011, and published as WO 2012/149983 A1 in English.

FIELD OF THE INVENTION

The discussion below is merely provided for general background information and is not intended to be used as an aid in determining the scope of the claimed subject matter.

Aspects of the present invention relate to photographing products, particularly suitable for photographing fashion related products such as apparel products, fashion accessories or other life style products. More specifically, aspects of the invention relate to an imaging apparatus for providing background separated images optimized for fashion related products and a controller for controlling the imaging apparatus.

BACKGROUND

Digital images are made up of a number of channels, usually red, green and blue in digital photography. These red, green and blue channels combine to produce a full-color RGB image. An image of an object wherein the visible background is removed is called a background separated image. The object is separated from its background by making the background transparent. A known technique for creating a background separated image makes use of alpha channels. Alpha channels are masks through which digital images can be displayed. The alpha channel is e.g. an 8-bit channel, in which case it can have 256 levels of gray from 0 (black) to 255 (white). White pixels define the area in the image that is to remain visible. Black defines the area in the image that is to be transparent. The level of gray in between determines the level of visibility, also known as opacity. For example, 50 percent gray allows for 50 percent visibility. Alpha channels are typically used with full-color RGB images. The resulting background separated image is a RGBA image, i.e. RGB+A, wherein 'A' means alpha channel.

Images of fashion related products are typically used in advertisements, catalogs and online shops for promotion and sales purposes. It is preferred to use high quality images to give potential customers a good impression of the products. Attributes of high quality images of fashion related products include excellent image details, clear product edges and the absence of a visible background. The absence of the visible background allows the image to be superimposed on any existing digital image, while retaining texture and fabric details of the photographed product.

Conventionally, photography studios are used to achieve high quality images. The photography studio employs specialists who are experts in generating high quality images of products, such as apparel products. Before taking a picture the specialist carefully positions the product in front of the camera and adjusts the lighting. After taking the picture, the digital image is manually manipulated by clicking along segments of the edges of an object depicting the product on a computer screen to define an outline of the object so that the object can be separated from its background. Manual graphic editing tools are used to separate the object from its background and possibly to further enhance the image. This process of photographing is often time-consuming and costly, requiring a skilled and well trained specialist.

There is a need for an improved imaging apparatus for photographing products, particularly fashion related products, which enables users without specialized skills in photography to obtain background separated images of the products.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background. An aspect of the invention provides an imaging apparatus for photographing products, particularly suitable for fashion related products, which enables users without specialized skills in photography to obtain background separated images. Moreover, a controller with a user friendly user interface is provided for controlling the imaging apparatus.

According to an aspect of the invention an imaging apparatus according to claim 1 is proposed for photographing a product. The imaging apparatus is an all-in-one system, which means it includes everything required for it to work. Optionally, the imaging apparatus includes a table part as recited in claim 2. An end user can perform relatively easy tasks with the portable controller without requiring specialized skills, while the table part performs complex control of the table part and performs complex digital image processing. Typically, all that the end user needs to do is place the product to be photographed on the table surface, look at the live stream on the portable controller to check if the product is placed in good view of the camera, and press a button on the portable controller to instruct the table part to generate the digital photograph. The claimed apparatus enables a user friendly graphical user interface on the portable controller for watching the live view and instructing the table part to generate a background separated image. The taking of multiple photos while controlling the backlighting system and the complex digital image processing of the taken photos to generate the background separated image can advantageously be automatically performed by the table after a simple tap on the take photo button by the end user. The portable controller advantageously enables the end user to operate the imaging apparatus from anywhere within the wireless range of the wireless controller. The end user may e.g. walk around the table part while using the portable controller. Further, the backlighting system comprising an LED panel advantageously enables a flat design of the backlighting system.

The embodiment of claim 2 advantageously enables the embedded system to be hidden within the table part.

The embodiment of claim 3 advantageously enables the end user to transport the stored images.

The embodiment of claim 4 advantageously enables easy disassembly of the table part, e.g. for transporting the imaging apparatus or for replacing parts.

The embodiment of claim 5 advantageously enables high quality photos to be taken, i.e. with minimal background noise and optimal back light from the backlighting system.

The embodiment of claim 6 advantageously enables the table part to provide feedback to the end user without using the portable controller.

The embodiment of claim 7 advantageously enables zooming on manually operated zoom lenses. The zoom device is e.g. a robotic type of device for operating the manual zoom lens.

The embodiments of claims 8 and 15 advantageously enable a user friendly graphical user interface on the portable controller for verifying and/or adjusting the end result before sending the instruction to generate the background separated image.

The embodiments of claims 9 and 16 advantageously enable a user friendly graphical user interface on the portable controller for watching the background separated image as generated by the embedded computer and for instructing the embedded computer to store the background separated image on the storage.

The embodiments of claims 10 and 17 advantageously enable multiple variants of the background separated image to be stored with a single tap on the export button.

The embodiments of claims 11 and 18 advantageously enable a user friendly graphical user interface on the portable controller for verifying and/or adjusting the background separated image.

The embodiment of claim 12 advantageously enables a user friendly graphical user interface. The touch screen may be capable of receiving a single touch or multiple touches at the same time.

The embodiment of claim 13 advantageously enables fashion related products to be photographed. E.g. apparel products can be relatively large. To enable the whole of the apparel product to be photographed, the dimensions of the table part can be such that the whole apparel product fits on the table surface.

According to another aspect of the invention a portable controller is proposed that is configured for use with the imaging apparatus and having one or more of the features as described above.

According to another aspect of the invention a graphical user interface is proposed that is configured for use in the imaging apparatus as described above. The graphical user interface comprises a result window having the advantages as described for any one of the claims 1-13.

According to another aspect of the invention a computer program product is proposed for providing the graphical user interface having one or more of the features described above.

According to an aspect of the invention a method according to claim 14 is proposed. Thus, a user friendly method is provided for making background separated images using a user friendly graphical user interface, which has the advantages as described above.

According to another aspect of the invention a computer program product is proposed, which, when being executed by a processor, is adapted to perform the steps of any one of the claims 14-18.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which.

DETAILED DESCRIPTION

The imaging apparatus of the present invention makes use of sophisticated dual-shot photographing technique and makes it available to any user without requiring specialized skills. By fixing a camera and lights in an ideal position, removing the classic PC desktop user interface with manual graphical editing tools, and moving all user interaction to a portable tablet controller, preferably having a touch screen interface, users can be fully operational with minimal training. At the same time, the background is removed from the image in a quality otherwise only achievable by highly trained users.

The imaging apparatus is an all-in-one system, which means it includes everything required for it to work. For better support, updates and maintenance, the system may be configured with internet access to allow remote access and downloading of software updates.

Figure 1:
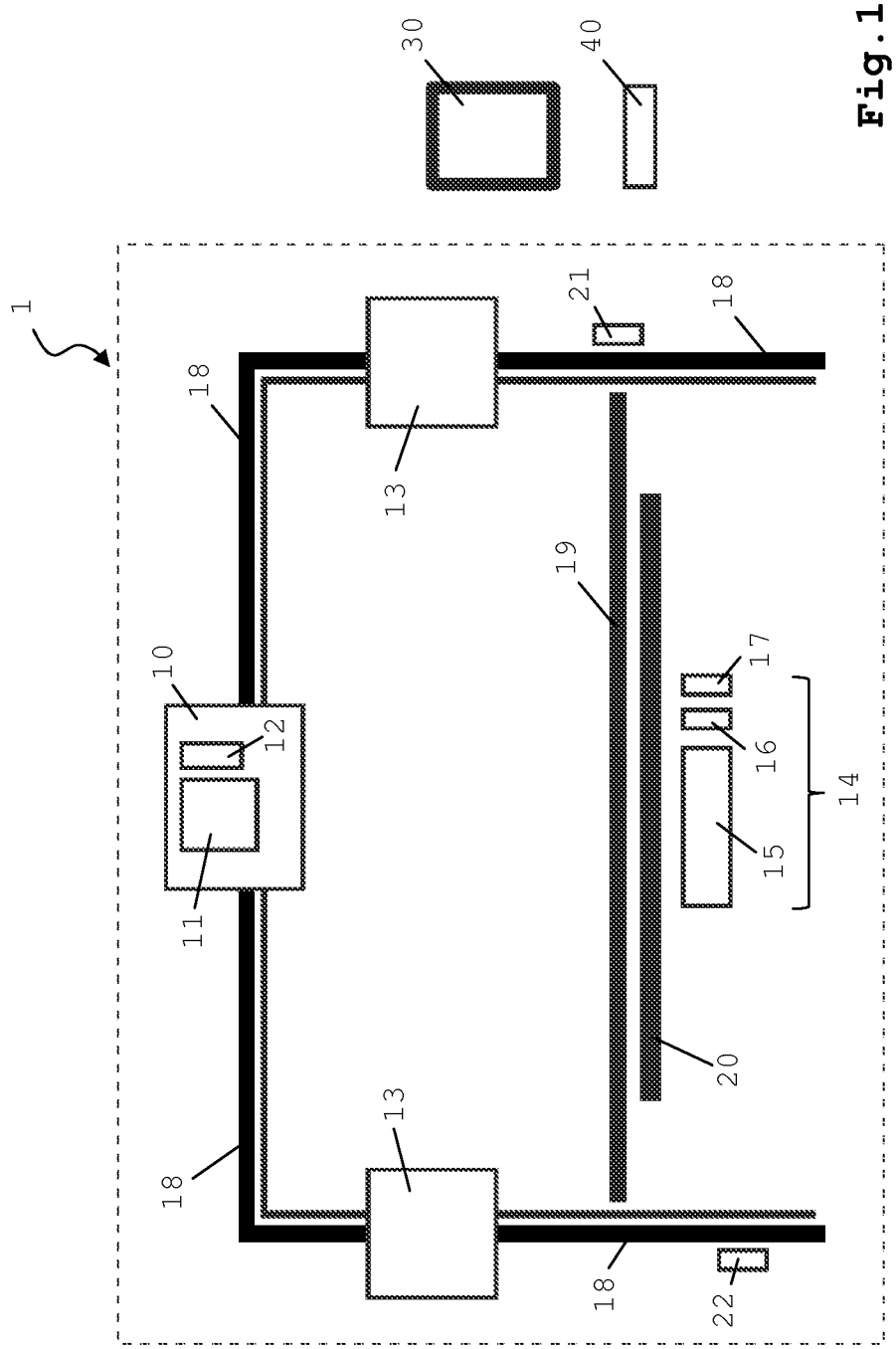
FIG. 1 shows an architectural design of an imaging apparatus of an exemplary embodiment of the invention.

FIG. 1 shows an architectural design of an imaging apparatus of an exemplary embodiment of the invention. The elements in the dashed box depict a schematic side view of a table part 1 of the imaging apparatus. The dimensions and design of the table part 1 are typically optimized for photographing fashion related products such as apparel products, fashion accessories or other life style products. The construction of the table part 1 typically contains a support structure 18 for supporting a table surface 19. The part of the support structure 18 situated above the table surface 19 may be formed by an arc structure for supporting one or more lights 13 and a fixture 10 for a fixed or zoom camera 11. The table part 1 further contains a backlighting system 20 and an embedded system 14 hidden in the table part 1.

The imaging apparatus of FIG. 1 further comprises a portable tablet controller 30 for user interfacing to the end user, and a storage 40 for storing images. The storage 40 is typically an external storage that can be detachably connected to the table part 1. Examples of external storages are USB storage devices, Thunderbolt storage devices and Firewire storage devices.

The camera 11, the lights 13, the embedded system 14 and the backlighting system 20 may be detachably connected to the table part 1 using brackets to enable easy disassembly and transportation of the imaging apparatus and, if needed, easy replacement of components.

The active working surface 19 of the table part 1 may be formed by an 1800×1200 mm area of unobstructed working area. Preferably the table surface is a scratch resistant glass surface. The backlighting system 20 can actively change the brightness of the table surface 19 as observed by the camera 11 from dark to bright.

The backlighting system 20 contains light elements that change from dark to white between two shots taken by the camera 11 of the imaging apparatus. With the backlighting system 20 off, the digital photograph includes a dark background. With the backlighting system 20 on, the photograph includes a light background. The difference between the two digital photographs can be used to create an alpha channel mask. The backlighting system 20 can contain any type of light elements, but preferably one or more LED panels are used. A LED panel is advantageously relatively flat compared to conventional backlighting systems, resulting in low space requirements for fitting the lighting system 20 in the table part 1. The surface 19 as seen by the camera 11 should be able to change color from very dark to very light. To achieve a very dark color the LED panel may be covered with a dark plastic translucent sheet resulting in a substantially black background when the backlight system is off. The very light color may be achieved by using an LED panel that produces e.g. at least 2000 Lumen. The backlight system 20 may be capable of producing different light intensities by being dimmable.

The backlighting system 20 may serve as a status indicator for the whole imaging apparatus e.g. by producing different flashing patterns for error reporting or by automatically turning on when a connection is established between the tablet controller 30 and the embedded system 14.

The embedded system 14 comprises an embedded computer 15 running a server application to control the camera 11 and perform image processing algorithms. Furthermore, the computer 15 controls the storing of images on the external storage 40 and communicates with the tablet controller 30 for the user interface on the tablet 30. The embedded system 14 typically comprises a Wi-Fi router 16 for connection with tablet controller 30. Alternatively, any other wireless technique may be used to enable communication between the embedded computer 15 and the tablet controller 30. Furthermore, the embedded system 14 may comprise electronics 17 to interface between the embedded computer 15 and controllable hardware elements of the table part 1, such as the backlighting system 20 and the camera 11.

The camera 11 is preferably capable of taking high resolution images, such as 15 megapixels or more. A Canon 5D mkII camera may e.g. be used or any other suitable camera. The image sensor of the camera 11 is preferably a full frame sensor, allowing use of lower distortion lenses on the camera 11. The lens is preferably characterized by a low barrel distortion, a focal length which allows the camera 11 to capture the entire active table surface 19, a minimum chromatic aberration, and a possibility to zoom in on details when using a zoom device 12. A Canon 24-105 mm USM L lens may e.g. be used or any other suitable lens. The camera 11 contains a programming interface for communication with the embedded computer 15. The fixed or zoom lens camera 11 is placed in the fixture 10, typically centered above the surface 19, ensuring stable and aligned view of the active area. The fixture 10 may be rotatable in the X, Y and Z axis to align the camera 11. For a manually operated zoom lens on the camera 11, the zoom device 12 may be part of the fixture 10 to operate the zooming of the camera.

The lights 13 ensure sufficient quality lighting on the product. Depending on the lighting conditions surrounding the imaging apparatus one or more lights 13 may be used. The lamps preferably provide good color rendering and are soft (diffuse) enough to not cast hard shadows within the product itself. Bowens StreamLite 530 lights may e.g. be used or any other suitable lights.

The portable tablet controller 2 is a user friendly device running a graphical user interface, preferably operated via a multi-touch screen. The tablet controller 2 is preferably light enough to hold in one hand while operating it with the other hand. The tablet controller 2 is typically a tablet PC, such as e.g. an Apple iPad, an Apple iPad2, a HTC Flyer, a Motorola Xoom, a Samsung Galaxy Tab, a Toshiba Tablet, or any other suitable tablet PC. It is to be understood that, although a tablet form factor is preferred, instead of a tablet controller any other portable device capable of displaying a graphical user interface and wirelessly connecting to the embedded computer 15 may be used.

The user interacts with the table part 1 of the imaging system by placing a product on the glass top 19 of the table, ensuring the product looks good. As long as the embedded system 14 is powered via power outlet 22, it is typically always on and need not be booted or activated before operation. The user can turn product lights 13 on or off with hardware switches. The user's main interaction with the system is through the tablet's 30 touch screen interface. All operations are preferably done by touch gestures and tapping on the screen of the tablet 30, thus no desktop keyboard/mouse setup is required. The touch screen tablet 30 communicates wirelessly with the computer 15 inside the table. Commands such as taking pictures, rotation and exposure adjustments are sent from the tablet 30 to the embedded system 14.

An interface between the embedded system 14 and the camera 11 enables control of camera settings and taking pictures. An interface between the embedded system 14 and the zoom device 12 enables control of the zoom lens of the camera 11. The embedded system 14 can switch and dim the backlighting system 20 via the electronics 17.

For support purposes, the embedded system 14 may be connected via Ethernet to internet, allowing support to remotely access the embedded system 14 and transfer stored usage tracking data.

Pictures are preferably saved directly to the connected external storage 40. Users may plug the storage device 40 into the appropriate connector 21 while they are photographing, and take it away when they are done.

Figure 2:
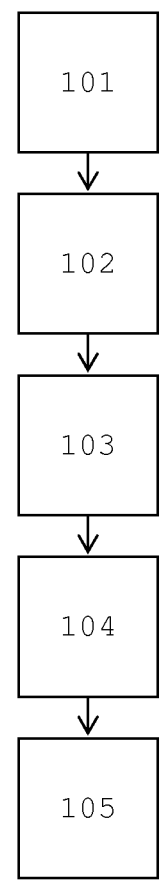
FIG. 2 shows steps of a workflow of using the imaging apparatus of an exemplary embodiment of the invention.

A typical workflow of using the imaging apparatus is shown in FIG. 2. In step 101 the product is positioned on the table surface 19, while a live preview through the camera 11 is displayed on the tablet 30. In step 102 the user uses the touch screen of the tablet 30 to rotate the image using fingers and may even adjust the exposure. The user can move the tablet 30 around for a convenient working position. In step 103 the imaging apparatus takes two photos, one with white and one with black background. In a matter of seconds, the image is automatically processed, cropped, and the background is automatically removed by the embedded computer 15. Any known image transparency algorithm, such as using alpha channels, may be used on the embedded controller 15 to create the background separated image from the two photos taken. In step 104 a result screen is shown on the tablet 30. This enables the user to review the photo as processed by the embedded computer 15. The user may change the background of the image on the tablet 30 between a pattern and a high contrast color to enable a detailed reviewing. By pressing and moving a finger on the touch screen a loupe object may be operated on the graphical user interface to inspect image details by zooming in to a part of the image. In step 105 the image may be exported to the storage 40. An article name or number may be entered and an image category may be chosen after tapping an export button to save the image. Variants of the image may be stored automatically when exporting the image, e.g. having different file formats, pixel resolutions and/or backgrounds for visualizing the transparent part of the image.

The graphical user interface of the tablet controller 40 may be implemented by an application running on the tablet controller 30. If, for example, the tablet 30 is an Apple iPad, then an iOS application may be installed on the iPad for operating the imaging apparatus. If, for example, the tablet 30 is a Samsung Galaxy Tab, then an Android application may be installed on the Galaxy Tab for operating the imaging apparatus.

When the application is started on the tablet controller 30, a progress window may be displayed indicating the progress of connecting with the embedded system 14. Details of the progress may be displayed upon tapping the progress window, which details may include a table connection status, a camera connection status and an external storage connection status.

When the imaging apparatus is operational, a library window with available storage locations on the storage 40 may be shown. The storage locations are typically folders and may be visualized as a grid of folder thumbnails with folder names below the thumbnails. To start photographing, the user selects one of the folders by tapping a folder icon to tell the system where to store the images. A new folder may be created if desired. The library window may display a number to indicate how much space is left on the external storage. When the library window is dismissed, it may slide down like an overlay panel, revealing the live view window behind it.

Figure 3:
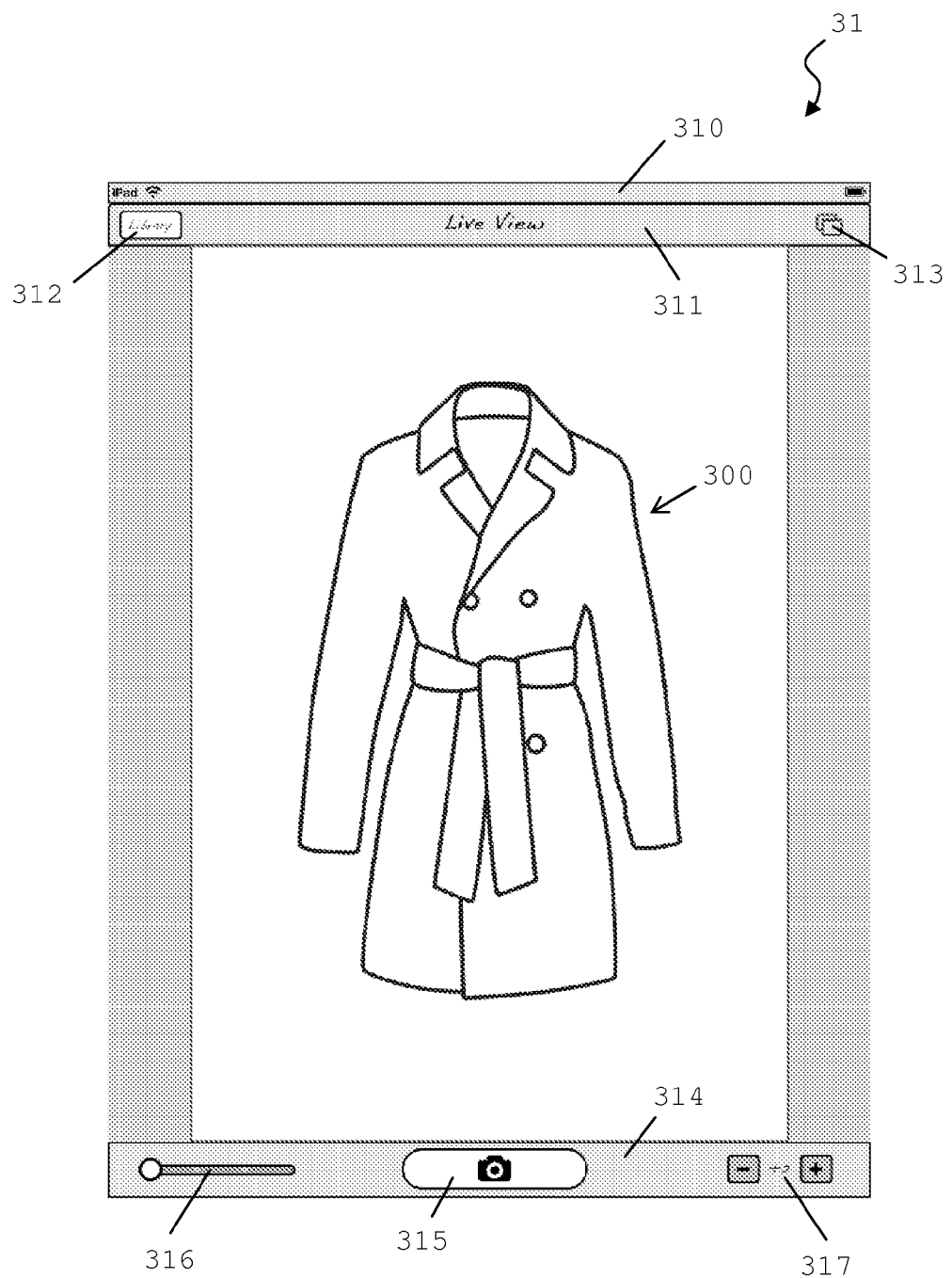
FIGS. 3-6 show different aspects of a graphical user interface of an exemplary embodiment of the invention.

In FIG. 3 a live view window 31 of an exemplary embodiment of the invention is shown. The live view window is typically accessed from the library window by selecting a folder, so the imaging apparatus knows where to store the images. The live view window 31 shows a live view stream 300 of the product, in this example an apparel product, on the table part 1 as seen through the camera 11, possibly after preprocessing by the embedded computer 15. A system bar object 310 may be displayed in the top of the window for accessing tablet controller specific functions outside of the application.

A top bar object 311 may contain a library button 312 to open the library window and an overlay icon 313 to access image overlay options. The library window may slide up on top of the live view window upon selecting the library button 312.

Optionally the name of the window (e.g. "live view") is shown in the middle of the top bar object 311.

A bottom bar object 314 may contain a take photo button 315 to take the picture, a slider object 316 to control the zoom device 12, and an exposure object 317 to adjust the exposure. The exposure object 317 may include a '+' and a '−' button to adjust the exposure. A numeric indicator in the exposure object 317 may indicate the position relative to a factory preset. The slider object 316 may be a 4-step slider to enable zooming in the interval of the lens, ranging from viewing the full working area to product details. With the slider in the left position the image may be zoomed all out, while in the right position the image may be zoomed all in.

The image may be rotated during live viewing, even before taking a picture, using a rotation gesture such as e.g. a 2-finger rotate gesture. The computer 15 in the table part 1 registers the rotations and applies the rotation to the live view stream 300 and the processed image after taking the picture.

Figure 4:
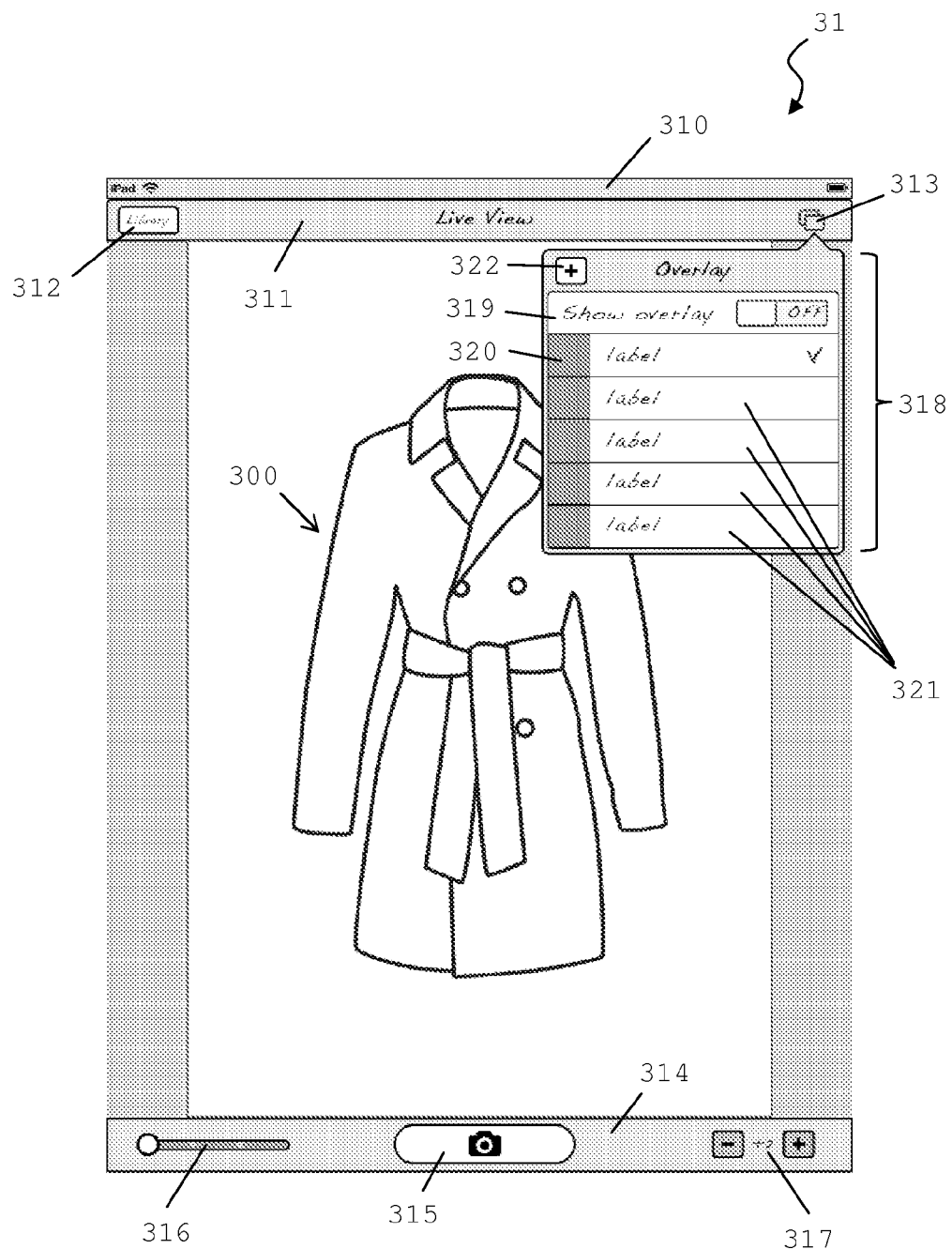

FIG. 4 shows the live view window of FIG. 3 after tapping the overlay icon 313. When the overlay icon 313 is tapped, a popover object 318 appears. An overlay toggle button 319 enables an overlay image to be shown at e.g. 50% opacity on top of the live view stream 300. Another opacity level may be preconfigured instead. The overlay image is selectable by tapping one of the available images in the list of images indicated by 320 and 321. For the selected overlay image the list may include a visual cue like a checkmark, as shown with list item 320. In the example of FIG. 4 list items 321 are not selected. The overlay images shown in the list 320,321 are typically stored on the embedded computer 15. Overlay images may be added to the embedded computer 15 by pressing an add overlay image button 322 to initiate a file browser for browsing and selecting images from the external storage 40 to be copied to the embedded computer 15.

When the take photo button 315 is pushed, a countdown object may be displayed as an overlay on the live view window 31. The countdown may be aborted to return to the live view window 31 by e.g. tapping the countdown object, which is particularly useful if the take photo button 315 was pressed by accident. The live stream 300 may stay active during the countdown.

After the countdown ends or directly after pressing the take photo button 315 if no countdown object is implemented, a process indicator such as a spinning circular process indicator may be displayed on top of a dimmed static preview image of the live stream 300, while the imaging apparatus is taking photos and the embedded computer 15 processes the image.

Figure 5:
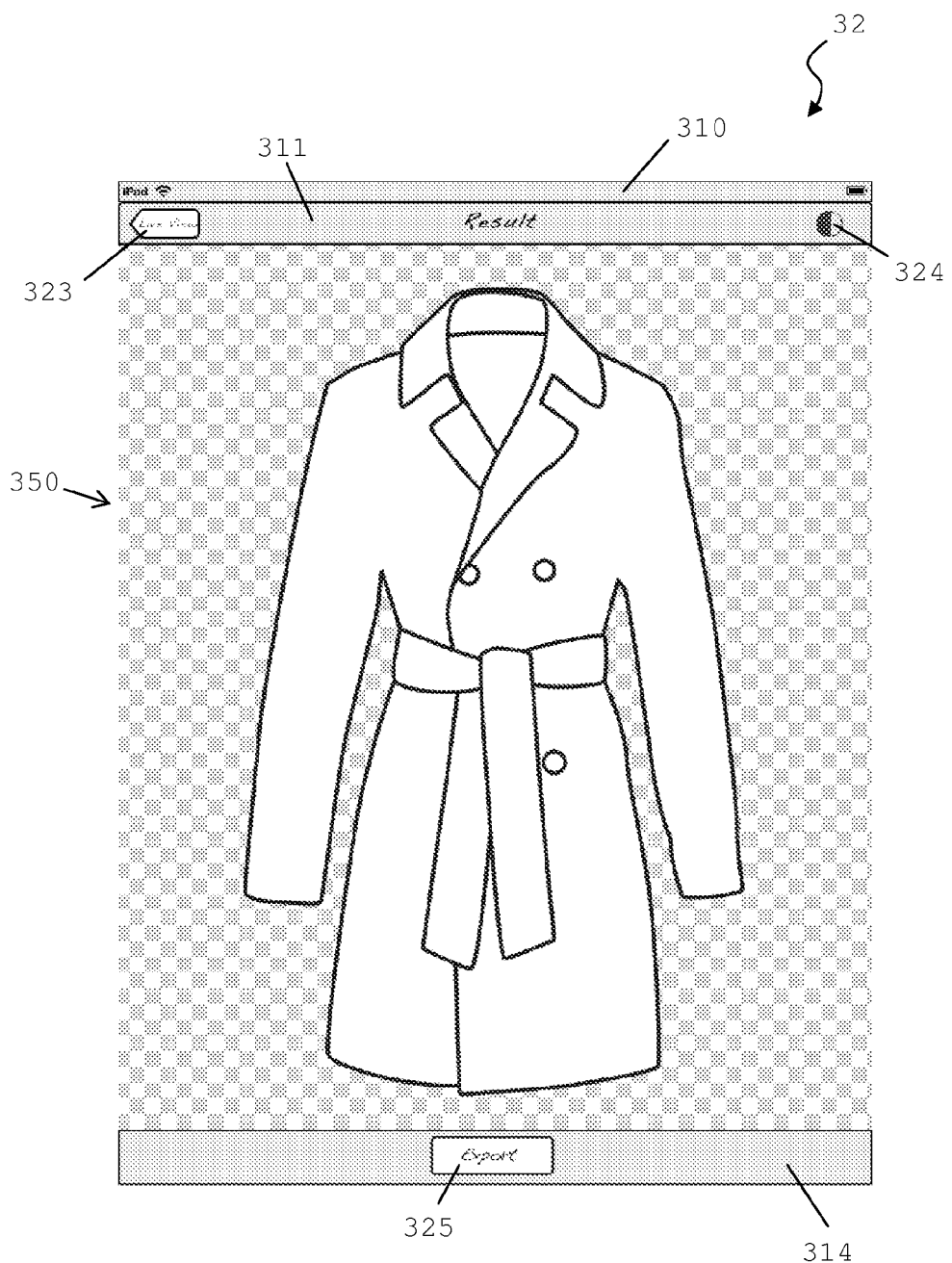

FIG. 5 shows a result window 32 of an exemplary embodiment of the invention, which is shown after taking the picture and processing the picture by the embedded computer 15. The result window 32 may slide into view from the right. A system bar object 310 may be displayed in the top of the window for accessing tablet controller specific functions outside of the application. In the result window 32 a top bar object 311 may contain a live view button 323 to open the live view window 31 and a background toggle button 324. Optionally the name of the window (e.g. "result") is shown in the middle of the top bar object 311. In the result window 32 a bottom bar object 314 may contain an export button 325.

The result window 32 allows the user to quickly review the overall result of the image 350, regarding styling, lighting and processing. The resulting image 350 is preferably shown on a pattern background for inspection by the user. The pattern background indicates transparency. The background toggle button 324 may switch the pattern background between different background patterns and/or colors. The background color may be remembered for the next time the result window 32 is shown. The export button 325 may be pressed when the result is approved and the image 350 is to be saved on the external storage 40.

Figure 6:
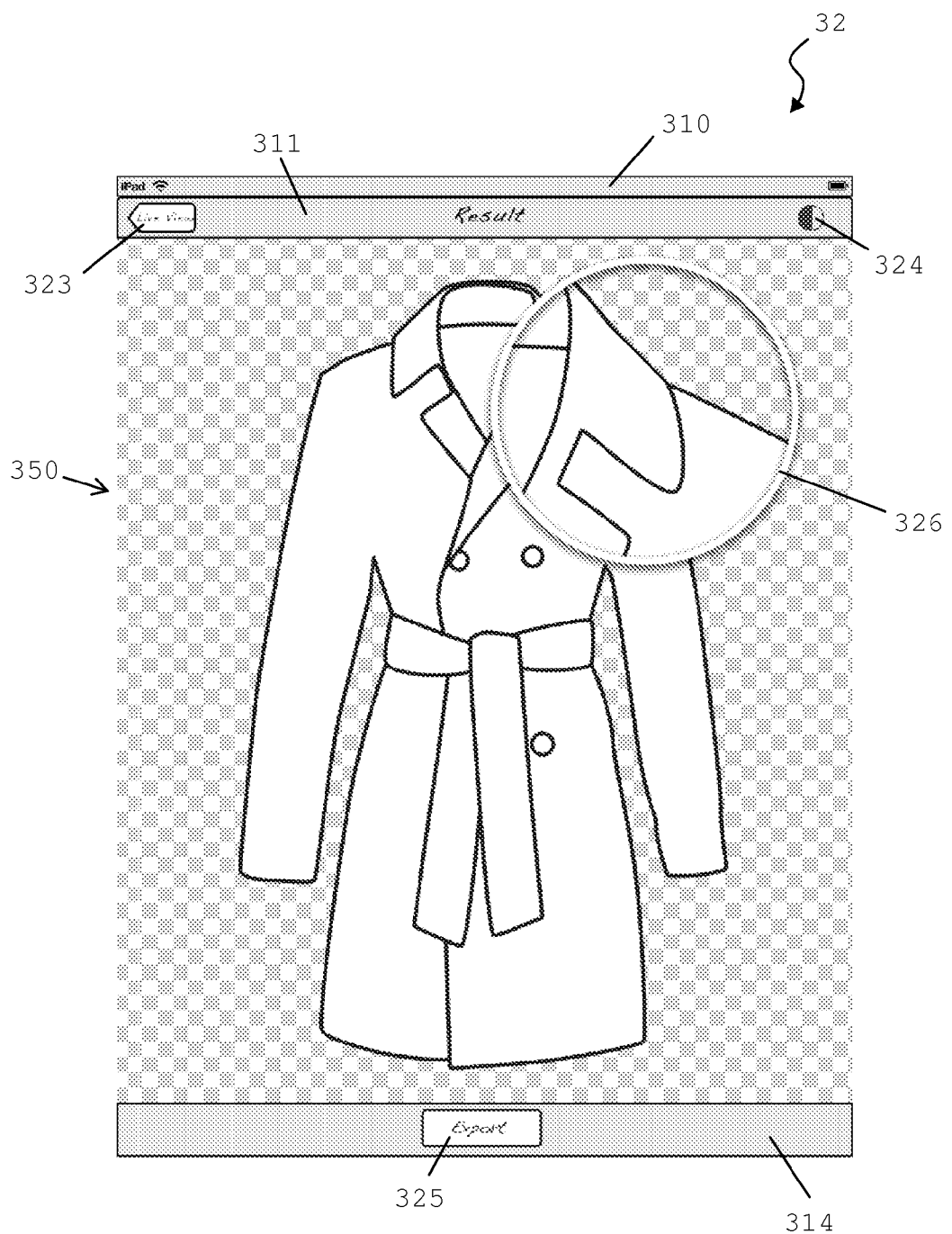

A loupe object may be activated to enable the user to inspect image details. FIG. 6 shows the result window 32 of FIG. 5 after activating a loupe object 326 to enlarge a portion of the image 350. The loupe object 326 appears to float the image 350 following the user's finger touching the touch screen. The loupe object 326 preferably displays the part of the image directly under the finger.

It is to be understood that instead of the described transitions between windows, such as the library window sliding down to reveal the live view window 31, any other transition may be used between windows. It is to be understood that instead of the described touches and gestures on objects in the graphical user interface, such as tapping and sliding with a finger on the touch screen, any other touch or gesture action may be used to activate the objects. A touch may be a single touch or a repetitive touch (e.g. double tap).

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory or flash memory) on which alterable information is stored. Moreover, the invention is not limited to the embodiments described above, which may be varied within the scope of the accompanying claims.

The invention claimed is:

1. An imaging apparatus for generating a background separated image of a fashion related product, comprising:
    a portable controller having a graphical user interface;
    a camera controllable to provide a live stream and selectively take photographs;
    a fixture configured to fix the camera;
    a backlighting system comprising an LED panel, the backlighting system being configured to produce different light intensities by being dimmable,
    the backlighting system being configured to assume a first active powered state and a second active powered state, wherein in one of said active powered states the backlighting system provides a light background for a photograph of the product and in another one of said active powered states the backlighting system provides a substantially black background for a photograph of the product; and
    a processing system comprising:
        a wireless communication controller operably coupled to the portable controller; and
        a computer operably coupled to the wireless communication controller and configured to:
            control the camera;
            switch the backlighting system between the first active powered state and the second active powered state;
            transmit the live stream from the camera to the portable controller via the wireless communication controller, the live stream comprising a live view as seen through the camera; and
            receive instructions from the portable controller via the wireless communication controller,
        wherein the graphical user interface comprises a live view window configured to display the live stream and comprises a take photo button configured to be triggered by a first user input,
        wherein the portable controller is configured to, in response to the first user input, transmit a first instruction to the computer to generate a background separated image of the product, and
        wherein the computer is further configured to, in response to the first instruction, generate the background separated image by:
            controlling the camera to take a first photograph of the product corresponding to the live stream being rendered while the backlighting system is in the first active powered state;
            controlling the backlighting system to switch from the first active powered state to the second active powered state;
            controlling the camera to take a second photograph of the product corresponding to the live stream being rendered while the backlighting system is in the second active powered state; and
            running a processing algorithm to generate the background separated image on a basis of the first and second photograph.

2. The imaging apparatus according to claim 1, wherein the imaging apparatus comprises a table part comprising:
    a support structure;
    a substantially horizontal table surface supported by the support structure for supporting the product when placed on the table surface;
    one or more lights supported by the support structure above the table surface for illuminating the product when placed on the table surface, wherein the fixture is supported by the support structure above the table surface.

3. The imaging apparatus according to claim 1, wherein the imaging apparatus comprises a storage for storing images, and wherein the storage is an external storage detachably connectable to the computer.

4. The imaging apparatus according to claim 2, wherein at least one of the camera, the lights, and the backlighting system is detachably connected to the table part using one or more brackets that are supported by the support structure.

5. The imaging apparatus according to claim 2, wherein the table surface comprises a scratch resistant glass surface.

6. The imaging apparatus according to claim 1, wherein the computer is configured to switch the backlighting system to provide status information about the imaging apparatus.

7. The imaging apparatus according to claim 1, wherein the fixture comprises a zoom device that is controllable by the computer to operate a zoom lens on the camera.

8. The imaging apparatus according to claim 1, wherein the live view window further comprises one or more of:
    a library button configured to be triggered by a second user input and result in displaying a library window for selecting a folder on a storage for storing images to store the background separated image;
    an overlay icon configured to be triggered by a third user input and result in a popover object being displayed on the live view window, wherein the popover object comprises an overlay toggle button configured to be triggered by a fourth user input and result in an overlay image selected from a list of overlay images to be displayed on the live stream at a predefined opacity;
    a slider object configured to be triggered by a fifth user input and result in a second instruction to the computer to zoom the camera in or out to a level indicated by the slider object;
    an exposure object configured to be triggered by a sixth user input and result in a third instruction to the computer to adjust an exposure level in the camera; and
    an area for displaying the live stream configured to be triggered by a seventh user input and result in a fourth instruction to the computer to rotate the live stream.

9. The imaging apparatus according to claim 1, wherein the graphical user interface further comprises a result window configured to display the background separated image as generated by the computer, the result window comprising an export button configured to be triggered by an eighth user input, and wherein the portable controller is configured to, in response to the eighth user input, transmit a fifth instruction to the computer to store the background separated image on a storage for storing images.

10. The imaging apparatus according to claim 9, wherein the computer is configured to, in response to the fifth instruction, store one or more variants of the background separated image on the storage.

11. The imaging apparatus according to claim 9, wherein the result window further comprises one or more of:
- a live view button configured to be triggered by a ninth user input and result in displaying the live view window;
- a background color button configured to be triggered by a tenth user input and result in changing a color and/or pattern of a transparent part of the background separated image; and
- a loupe object configured to be triggered by a eleventh user input and result in a portion of the background separated image to be zoomed in and displayed in the loupe object.

12. The imaging apparatus according to claim 1, wherein the portable controller comprises a touch screen for operating the graphical user interface and receiving user inputs.

13. The imaging apparatus according to claim 1, wherein the product is a fashion related product, such as an apparel product, a fashion accessory or any other life style product.

14. A method for generating a background separated image of a product in an imaging apparatus, the method comprising:
- displaying a live stream in a live view window of a graphical user interface of a portable controller, the live stream originating from a camera controllable to provide the live stream and selectively take photographs, of the imaging apparatus and being transmitted via a computer;
- providing a light background for a photograph of the product with a powered backlighting system comprising a LED panel, the backlighting system being configured to produce different light intensities by being dimmable and being configured to assume a first active powered state and a second active powered state, wherein in one of said active powered states the backlighting system provides a light background for a photograph of the product and in another one of said active powered states the backlighting system provides a substantially black background for a photograph of the product; and
- in response to a first user input triggering a take photo button in the live view window, transmitting a first instruction to the computer to generate a background separated image of the product using the camera by controlling the camera to take a first photograph of the product corresponding to the live stream being rendered while the backlighting system is in the first active powered state;
- controlling the backlighting system to switch from the first active powered state to the second active powered state;
- controlling the camera to take a second photograph of the product corresponding to the live stream being rendered while the backlighting system is in the second active powered state.

15. The method according to claim 14, further comprising one or more of:
- in response to a second user input triggering a library button in the live view window displaying in the live view window a library window for selecting a folder on a storage to store the background separated image;
- in response to a third user input triggering an overlay icon in the live view window displaying a popover object on the live view window, wherein the popover object comprises an overlay toggle button configured to be triggered by a fourth user input resulting in an overlay image selected from a list of overlay images to be displayed on the live stream at a predefined opacity;
- in response to a fifth user input triggering a slider object in the live view window transmitting a second instruction to the computer to zoom the camera in or out to a level indicated by the slider object;
- in response to a sixth user input triggering an exposure object in the live view window transmitting a third instruction to the computer to adjust an exposure level in the camera; and
- in response to a seventh user input triggering an area for displaying the live stream in the live view window transmitting a fourth instruction to the computer to rotate the live stream.

16. The method according to claim 15, further comprising:
- displaying the background separated image in a result window of the graphical user interface; and
- in response to an eighth user input triggering an export button in the result window, transmitting a fifth instruction to the computer to store the background separated image on the storage.

17. The method according to claim 16, wherein the computer is configured to, in response to the fifth instruction, store one or more variants of the background separated image on the storage.

18. The method according to claim 16, further comprising one or more of:
- in response to a ninth user input triggering a live view button in the result window displaying the live view window;
- in response to a tenth user input triggering a background color button in the result window changing a color and/or pattern of a transparent part of the background separated image; and
- in response to an eleventh user input triggering a loupe object in the result window displaying in the loupe object a zoomed in portion of the background separated image.

19. A computer program product stored on a non-transitory computer readable medium which, when being executed by a processor, is configured to perform a method for photographing a product in an imaging apparatus, the method comprising:
- displaying a live stream in a live view window of a graphical user interface of a portable controller, the live stream originating from a camera, controllable to provide the live stream and selectively take photographs, of a table part of the imaging apparatus and being transmitted via an embedded computer of the table part;
- providing a light background for a photograph of the product with a powered backlighting system comprising a LED panel, the backlighting system being configured to produce different light intensities by being dimmable and being configured to assume a first active powered state and a second active powered state, wherein in one of said active powered states the backlighting system provides a light background for a photograph of the product and in another one of said active powered states the backlighting system provides a substantially black background for a photograph of the product;
- triggering a take photo button in the live view window by a first user input;
- in response to the first user input, transmitting a first instruction to the embedded computer to generate a background separated image of the product using the camera by controlling the camera to take a first photograph of the product corresponding to the live stream being rendered while the backlighting system is in the first active powered state;

controlling the backlighting system to switch from the first active powered state to the second active powered state; and controlling the camera to take a second photograph of the product corresponding to the live stream being rendered while the backlighting system is in the second active powered state.

* * * * *